(12) United States Patent
Ackva et al.

(10) Patent No.: US 8,008,824 B2
(45) Date of Patent: Aug. 30, 2011

(54) ELECTRIC MOTOR

(75) Inventors: Ansgar Ackva, Würzburg (DE); Jacek Junak, Veitshöchheim (DE); Grzegorz Ombach, Veitshöchheim (DE)

(73) Assignee: Brose Fahrzeugteile GmbH & Co. Kommanditgesellschaft, Wuerzburg, Zuerzburg (DE)

( * ) Notice: Subject to any disclaimer, the term of this patent is extended or adjusted under 35 U.S.C. 154(b) by 210 days.

(21) Appl. No.: 12/162,966

(22) PCT Filed: Jan. 16, 2007

(86) PCT No.: PCT/EP2007/050405
§ 371 (c)(1),
(2), (4) Date: Nov. 7, 2008

(87) PCT Pub. No.: WO2007/088101
PCT Pub. Date: Aug. 9, 2007

(65) Prior Publication Data
US 2009/0102303 A1 Apr. 23, 2009

(30) Foreign Application Priority Data
Feb. 1, 2006 (DE) .......................... 10 2006 004 607

(51) Int. Cl.
*H02K 21/26* (2006.01)
(52) U.S. Cl. ......... 310/154.11; 310/154.22; 310/154.27; 310/154.46
(58) Field of Classification Search ............. 310/154.11, 310/154.21, 154.22, 154.24, 154.13, 154.27, 310/154.35, 154.36, 154.38, 154.39, 154.45, 310/154.46
See application file for complete search history.

(56) References Cited

U.S. PATENT DOCUMENTS

| 3,296,471 | A | * | 1/1967 | Cochardt | 310/154.46 |
| 4,023,057 | A | | 5/1977 | Meckling | 310/154 |
| 4,110,645 | A | * | 8/1978 | Hendershot, Jr. | 310/154.07 |
| 4,823,037 | A | | 4/1989 | Abukawa et al. | 310/230 |
| 4,883,996 | A | * | 11/1989 | Aoki | 310/154.24 |
| 4,899,074 | A | | 2/1990 | West | 310/154 |
| 5,034,641 | A | | 7/1991 | Komuro et al. | 310/154 |
| 5,548,171 | A | | 8/1996 | Ogawa et al. | 310/154 |
| 5,672,925 | A | * | 9/1997 | Lipo et al. | 310/154.11 |
| 5,936,320 | A | * | 8/1999 | Takeda et al. | 310/89 |

FOREIGN PATENT DOCUMENTS

| DE | 1 964 899 A1 | 7/1971 |
| DE | 27 21 019 A1 | 11/1978 |
| DE | 40 03 831 A1 | 8/1990 |
| DE | 37 37 603 C2 | 12/1990 |
| DE | 195 08 212 C2 | 1/1997 |
| DE | 198 08 550 C1 | 7/1999 |
| DE | 102 03 890 A1 | 8/2003 |
| FR | 2 503 948 A3 | 10/1982 |

\* cited by examiner

*Primary Examiner* — Dang D Le
(74) *Attorney, Agent, or Firm* — Westman, Champlin & Kelly, P.A.

(57) ABSTRACT

An electric motor (1) has a stator (3), a rotor (2) and a number of permanent magnets (6). The use of permanent magnets (6) having a cuboidal shape, without impairing performance. The stator (3) has a number of permanent magnets (6) having a cuboidal shape, which are embedded in recesses (7) and whose axial length (8) is greater than the axial length (4) of the stator (3).

18 Claims, 2 Drawing Sheets

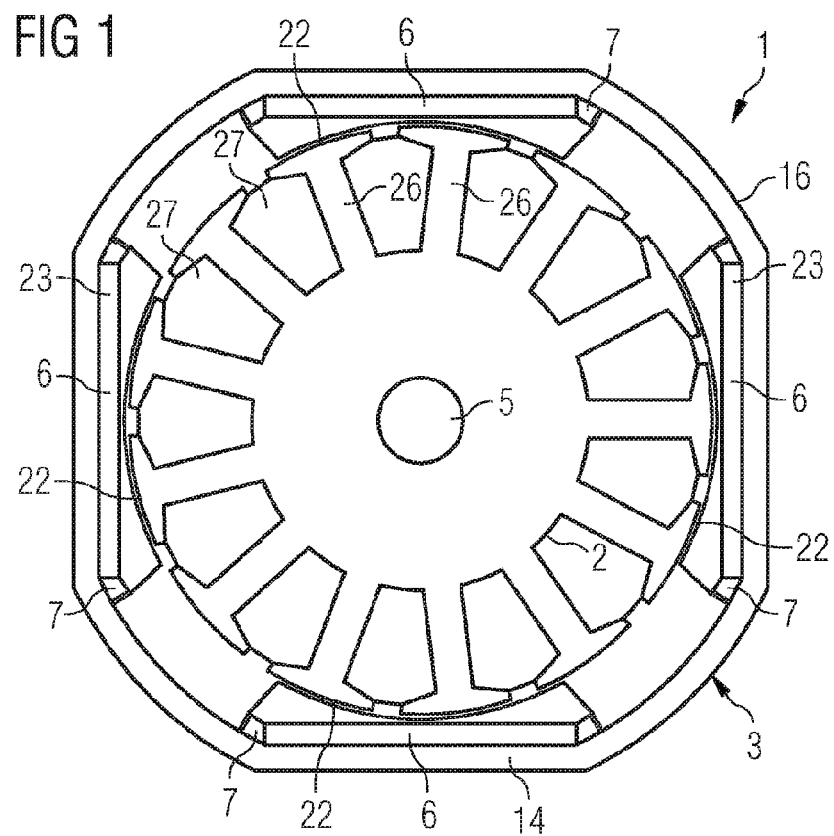
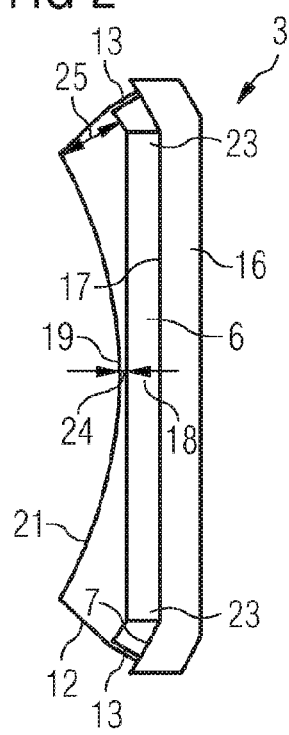

ELECTRIC MOTOR

CROSS-REFERENCE TO RELATED APPLICATIONS

This application is a U.S. national stage application of International Application No. PCT/EP2007/050405 filed Jan. 16, 2007, which designates the United States of America, and claims priority to German application number 10 2006 004 607.2 filed Feb. 1, 2006, the contents of which are hereby incorporated by reference in their entirety.

TECHNICAL FIELD

The invention relates to an electric motor with a stator and a rotor. In particular the invention relates to a direct-current motor with bushes, in which the stator features permanent magnets.

BACKGROUND

Rare earth magnets are often used in place of ferrite magnets as permanent magnets because of their better magnetic properties. To obtain a motor volume which is as small as possible the use of arc-shaped rare earth magnets is known. Usually these are attached directly to the yoke of the direct-current motor, with the aid of a glued or clamped connection for example.

For low-cost solutions, in which the volume of the motor does not have such a large part to play, instead of arc-shaped rare earth magnets, cuboidal-shaped rare-earth magnets are often employed. The use of cuboidal-shaped rare earth magnets however has a negative influence on the distribution of the magnetic flux in the motor, i.e. leads to an increase in the magnetic stray flux and thereby to a reduced motor torque.

SUMMARY

According to various embodiments, cuboidal-shaped magnets can be used in the stator of an electrical machine without this leading to a deterioration in its power.

According to an embodiment, an electric motor may comprise a rotor and a stator, wherein the stator comprises a number of cuboidal-shaped permanent magnets embedded in pockets, of which an axial length is greater than an axial length of the stator.

According to a further embodiment, the electric motor may be a direct-current motor with brushes. According to a further embodiment, the permanent magnets may project on both sides beyond the stator. According to a further embodiment, the stator may comprise a number of pole shoes corresponding to the number of permanent magnets, each connected by two webs to a yoke and which, between themselves and the yoke, form the pockets for accommodating the permanent magnets. According to a further embodiment, an inner contour or the pole shoes pointing in the direction of the rotor may embody an essentially constant air gap between the stator and the rotor. According to a further embodiment, the pole shoes can be embodied such that a distance from the permanent magnets to the rotor is at its smallest in the area of a center of the permanent magnets. According to a further embodiment, a thickness of the pole shoes in the center of the permanent magnets may be large enough for a mechanical rigidity of the construction to still be guaranteed. According to a further embodiment, the stator may consist of a laminated core. According to a further embodiment, the rotor and the stator may have essentially the same length. According to a further embodiment, the permanent magnets involved may be rare earth magnets.

BRIEF DESCRIPTION OF THE DRAWINGS

The invention will be described below with reference to exemplary embodiments which are explained in greater detail with the aid of drawings. The drawings show the following simplified schematic diagrams:

FIG. 1 a direct-current motor with stator and rotor in a front view according to an embodiment, FIG. 2 a part of the yoke of the direct-current motor from FIG. 1 with a pole shoes in a side view, FIG. 3 the stator of the direct-current motor from FIG. 1 with embedded permanent magnets in a perspective view, and FIG. 4 the stator from FIG. 3 in a further perspective view.

DETAILED DESCRIPTION

Figure 3:
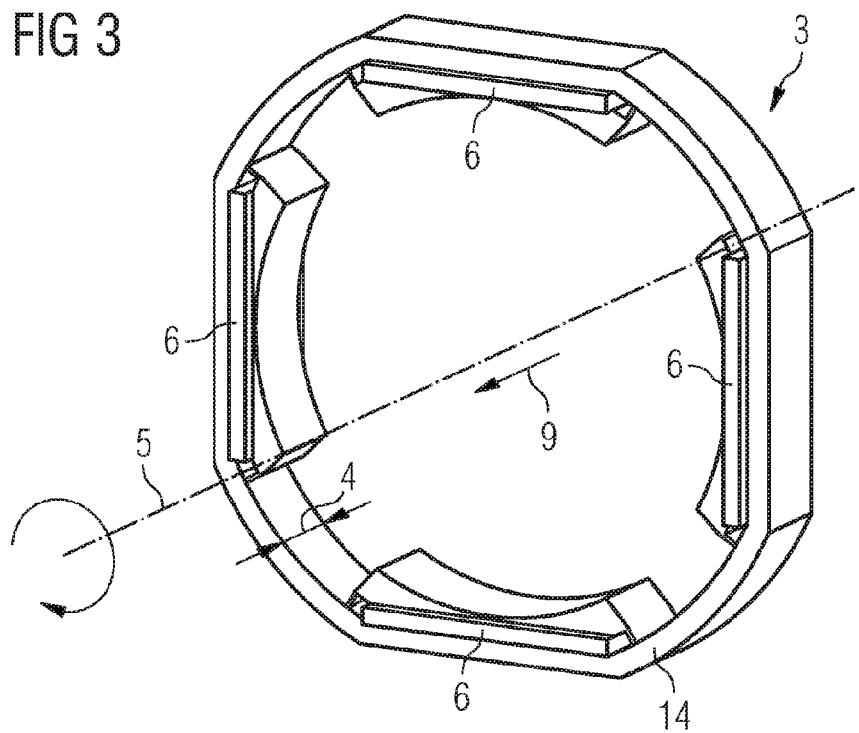
Figure 4:
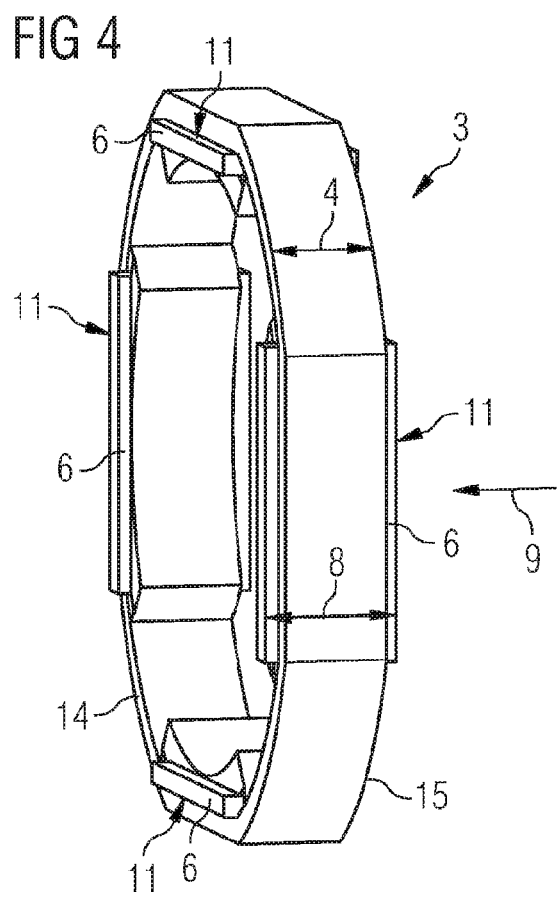

According to an embodiment, there may be provision for the stator to feature a number of cuboidal-shaped magnets embedded in pockets of which the axial length is greater than the axial length of the stator.

According to various embodiments, cuboidal-shaped magnets embedded in pockets may be used which project axially beyond the stator. In other words the permanent magnets have an overhang. This overhang leads to a reduction of the magnetic stray flux in an axial direction. The optimization of the flux path when low-cost, cuboidal-shaped permanent magnets are used enables the same performance to be obtained as with arc-shaped magnets of the same volume. This means that, even when high torque is demanded, there does not have to be recourse to the expensive arc-shaped design.

In accordance with an embodiment, the electric motor concerned is a direct-current motor with brushes. The various embodiments are especially suitable for direct-current motors which have a short stator length by comparison with their diameter.

Quite especially advantageous may be the use of direct-current motors according to various embodiments in motor vehicles since the question of fitting the motor into the smallest possible space has a particularly great significance here.

In accordance with a further embodiment, the permanent magnets project beyond the stator on both sides. To obtain an especially favorable distribution of the magnetic flux a symmetrical arrangement is preferably selected, i.e. the overhang is the same size on both sides of the stator.

In accordance with a further embodiment, the stator features a number of pole shoes corresponding to the number of the permanent magnets, which are each connected via two webs to a yoke and which form the pockets for holding the permanent magnets between themselves and the yoke. The thickness of the webs is preferably large enough for the mechanical rigidity of the construction to still be guaranteed. This enables the magnetic dispersion losses to be minimized. In other words, pole shoes and yoke are embodied in one piece.

The pockets preferably run in this case in the axial direction from one side of the stator to the opposite side of the stator and lie symmetrical to the respective pole shoes. In this way a holder for the permanent magnet is formed in a constructively simple manner which at the same time makes possible a favorable movement of the magnetic flux.

In accordance with a further embodiment, the inner contour of the pole shoes pointing in the direction of the rotor forms an essentially constant air gap between the stator and the rotor. This is achieved by a particular shape of the pole shoes.

The greater distance between the edges of the cuboidal-shaped permanent magnets and the rotor is compensated for by the shape of the pole shoes, i.e. in this area the thickness of the pole shoes is far greater than in the central area of the pole shoes.

The distance from the cuboidal-shaped permanent magnets to the rotor is at its smallest in the central area of the pole shoes, i.e. in the area of the center of the permanent magnet. In other words the thickness of the pole shoes is at its smallest in the center of the permanent magnets. Preferably the thickness of the pole shoes in the center of the permanent magnets is large enough for the mechanical rigidity of the construction to still be guaranteed. The reduction of the thickness of the pole shoes in the central area means that there is a reduction in the magnetic stray flux which passes through the pole shoes coming from the winding of the rotor.

A great advantage of this embodiment of the stator is that, by comparison with a similar design with arc-shaped permanent magnets, it does not lead to a significant increase in the diameter of the motor. At the same time this embodiment guarantees a more even distribution of the demagnetization forces across the magnet, i.e. by comparison with circuit arrangements with arc-shaped magnets, permanent magnets with worse material properties can be employed according to an embodiment, especially with lower values of the coercive field strength HcJ.

In accordance with a further embodiment, the stator consists of a laminated core. This comprises a number of layered stamped metal plates. The stator plates are held together for example by welding or clamping or tie rods which run in channels of the laminated core of the stator. The shape of the individual stator plates is selected such that, in the assembled state, the pole shoes connected via webs to the yoke described above and thereby the pockets for receiving the permanent magnets are produced.

In accordance with a further embodiment, the rotor and the stator have essentially the same length. If rotor and stator are manufactured as laminated cores from stamped metal plates, manufacturing can be undertaken especially effectively and with savings in materials. In addition this also provides advantages from the electrical or magnetic standpoint.

In accordance with a further embodiment, the permanent magnets involved are rare earth magnets, which have improved magnetic properties compared to ferrite magnets. Because of the higher remanence greater magnetic field strengths can be achieved so that the motor can be dimensioned smaller overall. Rare earth magnets are to be understood here as magnets made of rare earth magnetic materials such as for example plastic-bound materials.

According to an embodiment, the direct-current motor with brushes 1 has a rotor 2 and a stator 3 of the same axial length 4. In this case the length 4 is small by comparison with the diameter of the direct-current motor 1. The rotor 2 rotates within the stator 3 around an axis of rotation 5. The rotor 2 has a winding (not shown), which is supplied via brushes (both not shown) from a direct current source. The winding is located in the axial grooves 27 which are arranged between the teeth 26 of the rotor 2.

The stator 3 essentially consists of a laminated core with a plurality of stamped metal plates (not shown individually), which are held together by tie rods (also not shown). The shape of the individual stator plates is selected so that, in the assembled (laminated) state, the stator design described below is produced.

The stator 3 comprises four cuboidal-shaped permanent magnets 6 which are embedded in pockets 7 of the stator 3 and form a four-pole magnet arrangement. The four stator poles are in this case offset by 90° to each other. The permanent magnets 6 are rare earth magnets magnetized in the radial direction, for example based on NeFeB or SmCo.

The axial length 8 of the permanent magnets 6 is greater than the axial length 4 of the stator 3, according to an embodiment. This means that the permanent magnets 6 have an overhang 11 in an axial direction 9. In this case the permanent magnets 6 project beyond the stator 3 on both sides. The overhang 11 is the same side on both sides 14, 15 of the stator 3 and amounts in each case to around 5 percent of the total length of a permanent magnet 6.

The stator 3 has four pole shoes 12 which are connected in each case via two webs 13 to the yoke 16 and between which and the yoke 16 the pockets 7 for accommodating the permanent magnets 6 are formed. The thickness of the webs 13 is large enough for the mechanical rigidity of the construction to still be guaranteed. To obtain essentially cuboidal-shaped pockets 7, the yoke 16 runs in a straight line in these sections of the stator 3.

The pockets 7 run in this case in the axial direction 9, from the one side 14 of the stator 3 to the opposite side of the stator 15, and lie symmetrical to the respective pole shoes 3. This means that the center of the pocket 17, and thereby also the center 18 of the permanent magnet 6 held in the pocket 7, is assigned to the center 19 of the respective pole shoe 12.

The inner contour 21 of the pole shoe 12 pointing in the direction of the rotor 2 forms an air gap between the stator 3 and the rotor 2 which is as narrow as possible. The air gap 22 has an essentially constant width, in the present case around 1.3 mm. In other words the distance from the inner contour 21 of the pole shoe 12 to the rotor 2 is essentially constant.

The radial thickness 24 of the pole shoe 12 is at its smallest in the center 17, 18, 19. Thus the distance of the cuboidal-shaped permanent magnets 6 to the rotor 2 is minimal in this area. The radial thickness 24 of the pole shoe 12 in the center 17, 18, 19 is large enough here for the mechanical rigidity of the construction still to be guaranteed.

The greater distance of the edges 23 of the cuboidal-shaped permanent magnets 6 to the rotor 2 is compensated for by the shape of the pole shoe 12. The radial thickness 25 of the pole shoe 12 is in this area significantly greater than in the central area of the pole shoe 12, so that the distance to the rotor 2 is bridged with iron material. An undisturbed magnetic flux and thus a higher motor torque is thereby guaranteed. In this case the radial thickness and thereby the distance between the permanent magnets 6 and the rotor 2 changes continuously from the central area to the edge areas of the pole shoes 12.

The exemplary embodiment described, for low-cost cuboidal-shaped embedded rare earth permanent magnets, provides a significantly improved motor performance compared to the prior art with a comparatively smaller size of the direct-current motor 1, in that the permanent magnets 6 have an axial overhang 11 and at the same time the radial thickness 23 in the central area 19 of the pole shoes 12 is reduced. Both the overhang 11 of the permanent magnets 6 and also the special form of the pole shoes 12 guarantee a reduction in the magnetic stray losses and in combination ensure a significantly improved motor performance.

The invention claimed is:

1. An electric motor comprising a rotor and a stator,
wherein the diameter of the stator is greater than the axial length of the stator,
the rotor and the stator have essentially the same length, the stator comprises a number of cuboidal-shaped permanent magnets embedded in pockets, of which an axial length is greater than an axial length of the stator, wherein the stator comprises a number of pole shoes corresponding to the number of permanent magnets, each connected to by two webs to a yoke and which, between themselves and the yoke, form the pockets for accommodating the permanent magnets.

2. The electric motor according to claim 1,
wherein the electric motor is a direct-current motor with brushes.

3. The electric motor according to claim 1,
wherein the permanent magnets project on both sides beyond the stator.

4. The electric motor according to claim 3,
wherein an inner contour or the pole shoes pointing in the direction of the rotor embodies an essentially constant air gap between the stator and the rotor.

5. The electric motor according to claim 3,
wherein the pole shoes are embodied such that a distance from the permanent magnets to the rotor is at its smallest in the area of a center of the permanent magnets.

6. The electric motor according to claim 5,
wherein a thickness of the pole shoes in the center of the permanent magnets is large enough for a mechanical rigidity of the construction to still be guaranteed.

7. The electric motor according to claim 1,
wherein the stator consists of a laminated core.

8. The electric motor according to claim 1,
wherein the permanent magnets involved are rare earth magnets.

9. An method for providing an electric motor comprising a rotor and a stator, wherein the diameter of the stator is greater than the axial length of the stator,
the rotor and the stator have essentially the same length, comprising the step of providing the stator with a number of cuboidal-shaped permanent magnets embedded in pockets, wherein an axial length of each cuboidal-shaped permanent magnet is greater than an axial length of the stator, further comprising the step of providing the stator with a number of pole shoes corresponding to the number of permanent magnets, each connected by two webs to a yoke and which, between themselves and the yoke, form the pockets for accommodating the permanent magnets.

10. The method according to claim 9,
wherein the electric motor is a direct-current motor with brushes.

11. The method according to claim 10,
wherein the permanent magnets project on both sides beyond the stator.

12. The method according to claim 9,
wherein an inner contour or the pole shoes pointing in the direction of the rotor embodies an essentially constant air gap between the stator and the rotor.

13. The method according to claim 12,
wherein the pole shoes are embodied such that a distance from the permanent magnets to the rotor is at its smallest in the area of a center of the permanent magnets.

14. The method according to claim 9,
wherein a thickness of the pole shoes in the center of the permanent magnets is large enough for a mechanical rigidity of the construction to still be guaranteed.

15. The method according to claim 9,
wherein the stator consists of a laminated core.

16. The method according to claim 9,
wherein the permanent magnets involved are rare earth magnets.

17. A direct-current motor with brushes comprising a rotor and a stator,
wherein the diameter of the stator is greater than the axial length of the stator,
the rotor and the stator have essentially the same length, the stator comprises a number of cuboidal-shaped permanent magnets embedded in pockets, of which an axial length is greater than an axial length of the stator,
wherein the stator comprises a number of pole shoes corresponding to the number of permanent magnets, each connected to by two webs to a yoke and which, between themselves and the yoke, form the pockets for accommodating the permanent magnets.

18. The electric motor according to claim 17,
wherein the permanent magnets project on both sides beyond the stator.

* * * * *